(12) United States Patent
Lechner et al.

(10) Patent No.: US 7,862,014 B2
(45) Date of Patent: Jan. 4, 2011

(54) HYBRID DIFFUSER SYSTEM HEADLOSS BALANCING

(75) Inventors: John Lechner, Waukesha, WI (US); Lawrence B. Ratzlow, Muskego, WI (US); Peter Petit, Pewaukee, WI (US)

(73) Assignee: Siemens Water Technologies Corp., Warrendale, PA (US)

( * ) Notice: Subject to any disclaimer, the term of this patent is extended or adjusted under 35 U.S.C. 154(b) by 986 days.

(21) Appl. No.: 11/564,518

(22) Filed: Nov. 29, 2006

(65) Prior Publication Data

US 2007/0120276 A1    May 31, 2007

Related U.S. Application Data

(60) Provisional application No. 60/740,758, filed on Nov. 30, 2005.

(51) Int. Cl.
*B01F 3/04* (2006.01)

(52) U.S. Cl. .................................. 261/122.1; 261/124

(58) Field of Classification Search ............. 261/122.1, 261/122.2, 124, DIG. 70
See application file for complete search history.

(56) References Cited

U.S. PATENT DOCUMENTS

| | | | | |
|---|---|---|---|---|
| 2,144,385 A | * | 1/1939 | Nordell | 210/629 |
| 2,328,655 A | * | 9/1943 | Lannert | 261/122.1 |
| 2,521,454 A | * | 9/1950 | Dressler | 261/124 |
| 2,986,382 A | * | 5/1961 | Langdon | 261/124 |
| 3,664,647 A | * | 5/1972 | Snow | 261/30 |
| 3,785,629 A | * | 1/1974 | McKinney | 261/122.1 |
| 3,802,676 A | | 4/1974 | Thayer | |
| 3,864,441 A | * | 2/1975 | Suzuki | 261/122.1 |
| 3,953,553 A | | 4/1976 | Thayer | |
| 3,989,627 A | * | 11/1976 | Crandall | 210/220 |
| 4,012,470 A | | 3/1977 | Thayer | |
| 4,048,267 A | * | 9/1977 | Walker et al. | 261/122.1 |
| 4,273,732 A | * | 6/1981 | Roediger | 261/122.1 |
| 4,294,696 A | * | 10/1981 | Thayer | 210/220 |
| 4,961,854 A | * | 10/1990 | Wittmann et al. | 210/621 |
| 5,087,391 A | * | 2/1992 | Brown | 261/122.1 |
| 5,587,114 A | * | 12/1996 | Tharp | 261/124 |
| 5,690,864 A | * | 11/1997 | Tyer | 261/122.1 |
| 5,788,847 A | | 8/1998 | Tharp | |
| 5,846,412 A | | 12/1998 | Tharp | |
| 5,945,040 A | * | 8/1999 | Brauch et al. | 261/122.1 |
| 6,244,574 B1 | | 6/2001 | Downs | |
| 6,464,211 B1 | | 10/2002 | Downs | |
| 6,511,054 B1 | * | 1/2003 | Green | 261/122.1 |
| 6,863,810 B2 | | 3/2005 | Chann | |
| 7,267,766 B2 | * | 9/2007 | Campion et al. | 210/221.2 |

* cited by examiner

*Primary Examiner*—Scott Bushey
(74) *Attorney, Agent, or Firm*—Frederick C. Wilkins

(57) ABSTRACT

In a tank for treating wastewater and including a first plurality of air diffuser elements and a second plurality of air diffuser elements, means for adjusting the relative height of the first diffuser elements with respect to the height of the second diffuser elements in response to changing operating conditions in the tank and changes in the characteristics of the diffusers.

16 Claims, 4 Drawing Sheets

HYBRID DIFFUSER SYSTEM HEADLOSS BALANCING

RELATED APPLICATIONS

This application claims priority to U.S. Provisional Application No. 60/740,758 filed Nov. 30, 2005. All of the subject matter of that provisional application is incorporated herein by reference.

FIELD OF THE INVENTION

The present invention relates to wastewater treatment systems and the construction to compensate for headloss migration in a wastewater treatment system using ceramic elements and membrane diffusers.

BACKGROUND PRIOR ART

A conventional wastewater treatment plant typically involves aeration. One type of aeration device is a fine bubble diffuser. The most common types of fine bubble diffusers are ceramic elements and rubber membrane diffusers. In some wastewater treatment systems, the systems specify the use of both ceramic element diffusers and rubber membrane diffusers in the same system. For example, ceramic elements may be installed throughout most of the treatment tanks in the wastewater treatment system and with the use of rubber membrane diffusers installed in the remainder of the system. In such wastewater treatment systems, the rubber membrane diffusers and the ceramic elements are not mounted on any single header but are instead installed on separate grids of headers. However, both sets of grids of headers share the same air supply. In some applications, valves cannot be used to balance the air flow between the grid supporting the ceramic element diffusers and the grid supporting the rubber membrane diffusers.

It is known from testing that operating the diffusers for long periods of time results in headloss rise or "headloss migration" due to a change in the relative resistance to air flow through the fine bubble diffusers caused primarily by either biofouling and/or changes in water absorption of the diffuser elements.

In the design of a wastewater system it is difficult to design membrane and ceramic element diffusers to have identical headloss versus air flow curves. Additionally, it is also difficult to maintain the headloss from element to element within manufacturing control limits and to influence or predict the different rates of headloss migration arising as a result of fouling of the diffuser elements and changes in surface properties of the rubber membrane diffusers. It is also difficult to predict the changes over time of the flow volume into the wastewater treatment system and the operating flow rates of wastewater treated by the system as additional demands are placed on the system by growth of a community.

When two types of diffusers such as ceramic diffusers and rubber membrane diffusers are installed on headers or grids connected to the same air supply system, the less restrictive elements produce higher air flows. Even if balancing orifices are used to compensate for air flow between the header pipes into the diffuser elements, the balancing orifices have a non-linear headloss versus air flow curve, and that non-linear headloss versus air flow curve is significantly different than the headloss/air flow curve of the diffuser elements. Because the headloss/air flow curve of a ceramic diffuser element does not match the headloss/air flow curve of a rubber membrane diffuser, changes in air flow through the headers can only truly be balanced at one flow rate. Additionally, different rates of headloss migration over time complicate the situation further. If the migration rates are significantly different, which is usually the case between ceramic diffusers and rubber membrane diffusers, the balanced flow point will shift with time to a different system flow rate.

All of these factors prevent the engineer designing a system that may be balanced at initiation of operation of the wastewater treatment system to maintain its balance over the life of the system's operation.

SUMMARY

The invention involves installing provision to allow headers supporting one type of fine bubble diffuser element to be raised or lowered as needed and whenever an imbalance occurs, relative to headers supporting a second type of diffuser element.

If the two characteristic headloss/air flow curves of the diffuser elements are such that both share the same shape and slope, but one is shifted higher than the other by an inch of water, then reducing the elevation of the header with the more restrictive membranes by the same amount will compensate for the difference.

This approach is feasible because the flow imbalance through the diffuser elements is very sensitive to small differences in headloss. Therefore, it does not take much vertical correction in the position of the grid to bring the two types of grid elements into flow balance. Only a few inches of relative submersion difference is normally required to correct for the imbalance. If the characteristic headloss/air flow curves of the two types of elements have the same slope, then the resulting correction in elevation of the diffuser elements will result in substantially balanced flow distribution over a wide range of flow.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
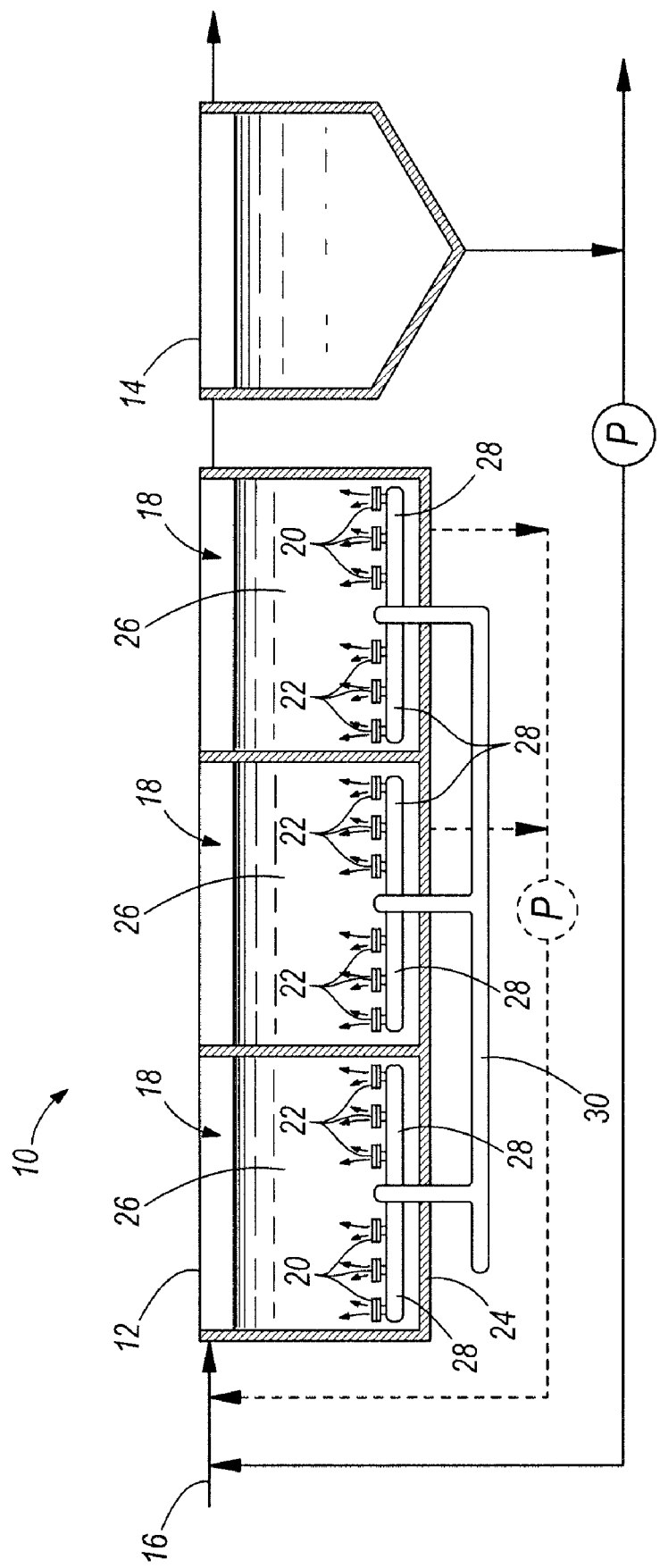
FIG. 1 is a schematic view of a wastewater treatment system embodying the present invention.

Illustrated in FIG. 1 is a wastewater treatment system 10 including an activated sludge tank 12 and a clarifier 14. Influent wastewater flows through supply 16 into the activated sludge tank 12 wherein the wastewater is treated. The activated sludge tank 12 will include several compartments or zones 18. The tank 12 further includes a plurality of air diffusers 20 and 22 mounted near the bottom 24 of the tank and intended to diffuse air in the form of small bubbles into the wastewater 26 in the tank 12. The air diffusers 20 and 22 are mounted on headers 28 and the headers 28 are connected to an air supply pipe 30.

Figure 2:
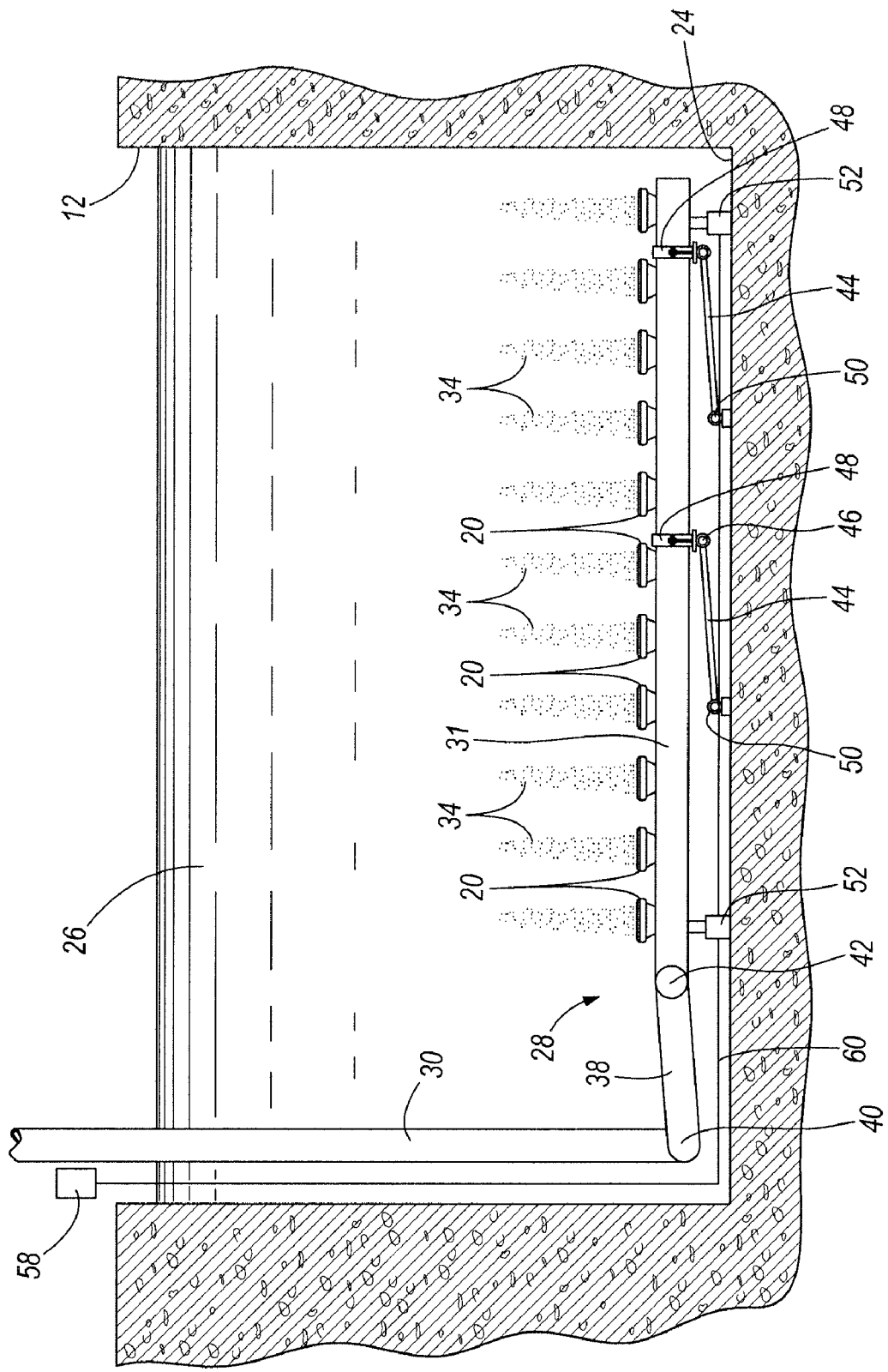
FIG. 2 is an enlarged cross-section elevation view of a portion of the wastewater treatment system illustrated in FIG. 1 and showing an elevation adjustment arrangement for a header.

One of the headers 28 is shown more particularly in FIG. 2. As shown in FIG. 2, at least one of the headers 28 includes a horizontally extending pipe 31 supported near the bottom 24 or the floor of the wastewater treatment tank 12. The horizontally extending pipe 31 supports a plurality of air diffuser elements 20 such that air or other gas can be discharged from the horizontally extending pipe 31 through the diffuser elements 20 and into the wastewater 26 in the form of fine bubbles 34.

The diffusers elements 20 can be any type of diffuser element for the type used in wastewater treatment and including ceramic diffusers and rubber membrane diffusers.

The horizontally extending pipe 31 is connected to an air supply pipe 30 which is in turn connected to a source of air pressure (not shown).

In the arrangement illustrated in FIG. 2 the header 28 is connected to the vertically extending air supply pipe 30 by an elbow joint pipe 38, the elbow joint pipe 38 having an end 40 pivotally connected to the lower end of the vertical pipe 30 and a second end 42 pivotally connected to an end of the pipe 31. The joined sections of pipe can pivot with respect to one another to permit relative vertical movement of the horizontal pipe 31.

The header 28 is also supported by a pair of support links or arms 44. Each of the support links 44 has one end 46 pivotally connected to a band 48 surrounding and supporting the header 31 and an opposite end 50 pivotally connected or mounted to the floor 24 of the tank 12. The support links 44 have the same length as the elbow joint pipe 38 and function to maintain the horizontal pipe 31 parallel to the floor 24 in response to relative movement of the pipe 31.

A pair of actuators 52 are also provided for effecting vertical movement of the header 28 with respect to the floor 24 of the tank. The actuators 52 each have one end supported by the floor 24 of the tank and an opposite end connected to the header 28 to move the header vertically. The actuators 52 can be a pneumatically actuated piston and cylinder. In other arrangements, the actuators could be a hydraulically actuated piston and cylinder or a screw driven extendable actuator, the screw being driven by an electric motor, mechanical language, by an air motor or hydraulic motor.

A control 58 is mounted externally to the tank 12 and can be connected through line 60 to the actuators 52 to control operation of the actuators 52 and thus control the relative vertical position of the header 28 in the tank.

Figure 3:
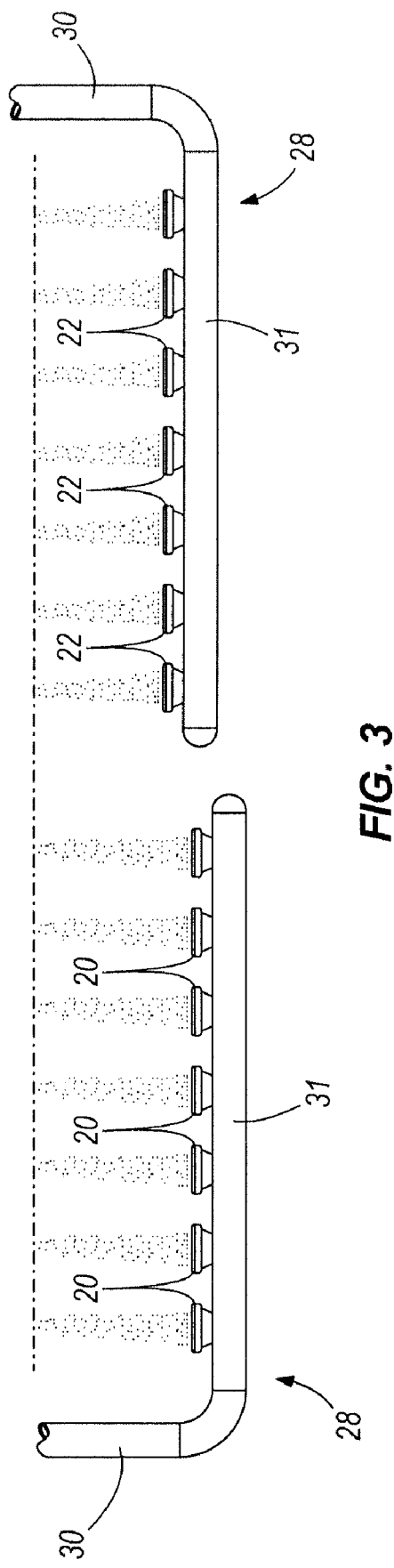
FIG. 3 is an enlarged illustration of headers shown in FIG. 1 and with the elevation of the headers adjusted to compensate for headloss migration.

In operation, the control 58 and actuators 52 can be used to change the vertical position of the header 28 in the tank and such that, as shown in FIG. 3, the relative vertical height of one header 28 can be changed with respect to the vertical height of another header 28 in the wastewater treatment tank 12. The head pressure of the wastewater 26 on the surface of the diffusers 22 can thus be changed to achieve a balance of air flow through the two sets of diffusers 20 and 22. During operation of the two sets of diffusers 20 and 22, the characteristics of the diffusers may change over time. These changes may be caused by microbial growth on the diffusers or by changes over time in the material characteristics of the diffusers. The operating parameters of the wastewater system may also change over time due to fluctuations in the quantity of wastewater flowing into the wastewater treatment system or changes in the characteristics of the wastewater being treated by the system.

The control 58 and actuators 52 can be used to maintain balance of the air flow through the different types of diffusers 20 and 22 and accommodate changes in the use of the wastewater system or changes in the flow characteristics of the diffusers over time.

Figure 4:
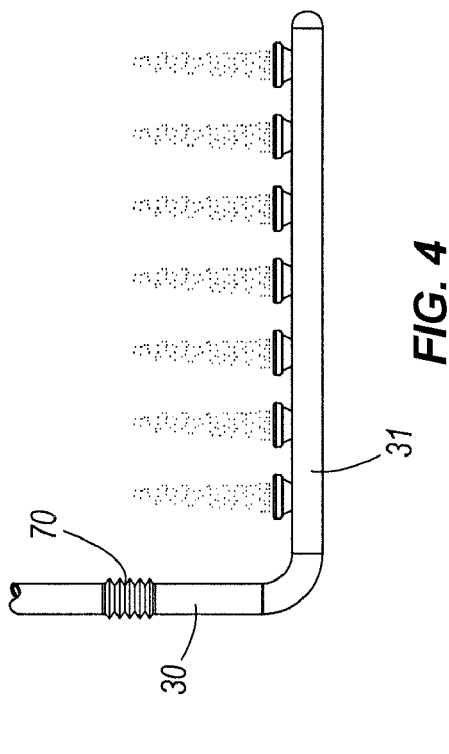
FIG. 4 is an illustration of an alternative arrangement to facilitate adjustment of the height of the header.

FIG. 4 illustrates an alternative arrangement for flexibly connecting the horizontal header 31 to the air supply pipe 30. In the arrangement shown in FIG. 4, the vertical pipe 30 supplying air flow to the horizontal header includes a flexible section of pipe 20, the flexible section of pipe having sufficient flexibility to accommodate several inches of vertical movement of the horizontal header 31 with respect to the bottom of the tank.

Figure 5:
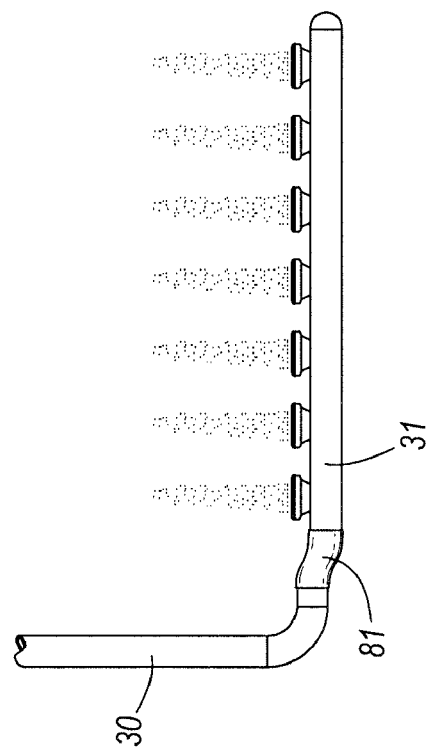
FIG. 5 is an illustration of another alternative arrangement for adjusting for the height of the header.

FIG. 5 illustrates another alternative arrangement wherein a flexible section 80 of pipe is provided in the end of the horizontal header 31 where the horizontal header 31 is connected to the air pipe 30 feeding air to the header. The flexible section of pipe 80 accommodates relative vertical adjustment movement of the horizontal header 31 with respect to the air supply pipe 30.

Figure 6:
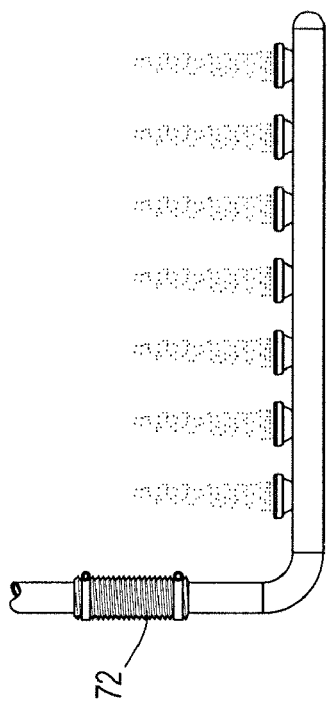
FIG. 6 is another alternative embodiment of an arrangement for adjusting height of a header.

FIG. 6 illustrates another arrangement wherein a flexible section of pipe 72 is joined in the air supply pipe 30 to accommodate relative vertical movement of the horizontal header 31.

Figure 7:
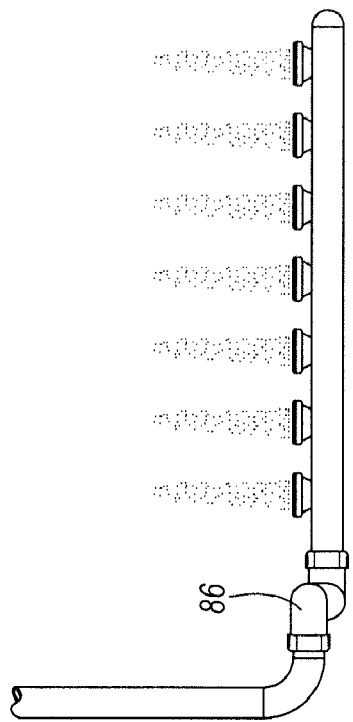
FIG. 7 is another alternative embodiment of an arrangement for adjusting for the height of a header.

FIG. 7 shows another alternative arrangement wherein an elbow joint 86 is provided between the air supply pipe 30 and the horizontal header 31 to facilitate relative vertical movement of the horizontal header 31 with respect to the supply pipe 30 in the bottom of the wastewater treatment tank.

Various features and advantages of the invention are set forth in the following claims.

What is claimed is:

1. A wastewater treatment system comprising,
   at least one tank for containing a volume of wastewater,
   an air supply,
   a first header, submerged in the volume of wastewater, and connected to an air supply,
   a plurality of first diffuser elements mounted on the first header for diffusing air into the wastewater,
   a second header submerged in the volume of wastewater and connected to an air supply,
   a plurality of second diffuser elements mounted on the second header for diffusing air into the wastewater,
   wherein the first header can be adjustably moved vertically with respect to the second header, and wherein the first and second diffuser elements maintain a vertical orientation in the tank during vertical movement.

2. The wastewater treatment system as set forth in claim 1, further comprising a height adjustment mechanism for adjustably varying the height of the first header with respect to the second header.

3. The wastewater treatment system as set forth in claim 2, wherein the height adjustment mechanism comprises an actuator mounted in the tank for moving the first header vertically with respect to the second header and a control for controlling operation of the actuator.

4. The wastewater treatment system as set forth in claim 1, wherein the first header is positioned at a first vertical position in the tank and the second header is positioned at a second vertical position in the tank different from the first vertical position.

5. The wastewater treatment system as set forth in claim 1, wherein the first diffuser elements are of a first type and the second diffuser elements are of a second type.

6. The wastewater treatment system as set forth in claim 1, further comprising a movable member having an end supported by the tank and an opposite end supporting the first header, the movable member being movable between a first position in the tank wherein the first header is at a first height and a second position in the tank wherein the first header is at a second height.

7. The wastewater treatment system as set forth in claim 6, further comprising an actuator, wherein the actuator is connected to the movable member for moving the movable member between the first position in the tank and the second position in the tank.

8. The wastewater treatment system as set forth in claim 7, wherein a portion of the actuator is submerged in the volume of wastewater.

9. A wastewater treatment system comprising:
at least one tank containing a volume of wastewater,
an air supply,
a first header, submerged in the volume of wastewater, and connected to an air supply,
a plurality of first diffuser elements mounted on the first header for diffusing air into the wastewater,
a second header submerged in the volume of wastewater and connected to an air supply,
a plurality of second diffuser elements mounted on the second header for diffusing air into the wastewater, and
a means for adjustably moving the vertical height of the first header with respect to the second header, wherein the first and second diffuser elements maintain a vertical orientation in the tank during vertical movement.

10. A tank for treating wastewater, the tank comprising:
a plurality of first diffuser elements connected to an air supply, the first diffuser elements are of a first type,
a plurality of second diffuser elements connected to an air supply, the second diffuser elements are of a second type,
a means for adjusting the vertical height of the first diffuser elements with respect to the vertical height of the second diffuser elements, and wherein the first and second diffuser elements maintain a vertical orientation in the tank during vertical movement.

11. The tank for treating wastewater as set forth in claim 10, further comprising a first header supporting the plurality of first diffuser elements and a second header supporting the plurality of second diffuser elements.

12. A method for treating wastewater comprising:
providing a tank containing a volume of wastewater,
providing a first set of diffuser elements in the tank connected to an air supply for diffusing air in the form of fine bubbles into the wastewater in the tank,
providing a second set of diffuser elements in the tank connected to an air supply for diffusing air in the form of fine bubbles into the wastewater in the tank, and
adjusting the vertical height of the first set of diffuser elements with respect to the vertical height of the second set of diffuser elements so that the first set of diffuser elements is positioned at a first vertical position in the tank and the second set of diffuser elements is positioned at a second vertical position in the tank different from the first vertical position.

13. The method as set forth in claim 12, wherein the step of adjusting the vertical height of the first set of diffuser elements with respect to the vertical height of the second set of diffuser elements balances the flow rates of air through the first set of diffuser elements with respect to the flow rate of air through the second set of diffuser elements.

14. The tank as set forth in claim 10, further comprising a means for adjusting the vertical height of the second diffuser elements with respect to the vertical height of the first diffuser elements to balance air flow through the first diffuser elements and the second diffuser elements in response to changing operating conditions in the tank and of the first and second diffuser elements.

15. The wastewater treatment system as set forth in claim 5, wherein the first diffuser elements are membrane diffusers and the second diffuser elements are ceramic diffuser elements.

16. The tank as set forth in claim 10, wherein the first diffuser elements are membrane diffusers and the second diffuser elements are ceramic diffuser elements.

* * * * *